UNITED STATES PATENT OFFICE.

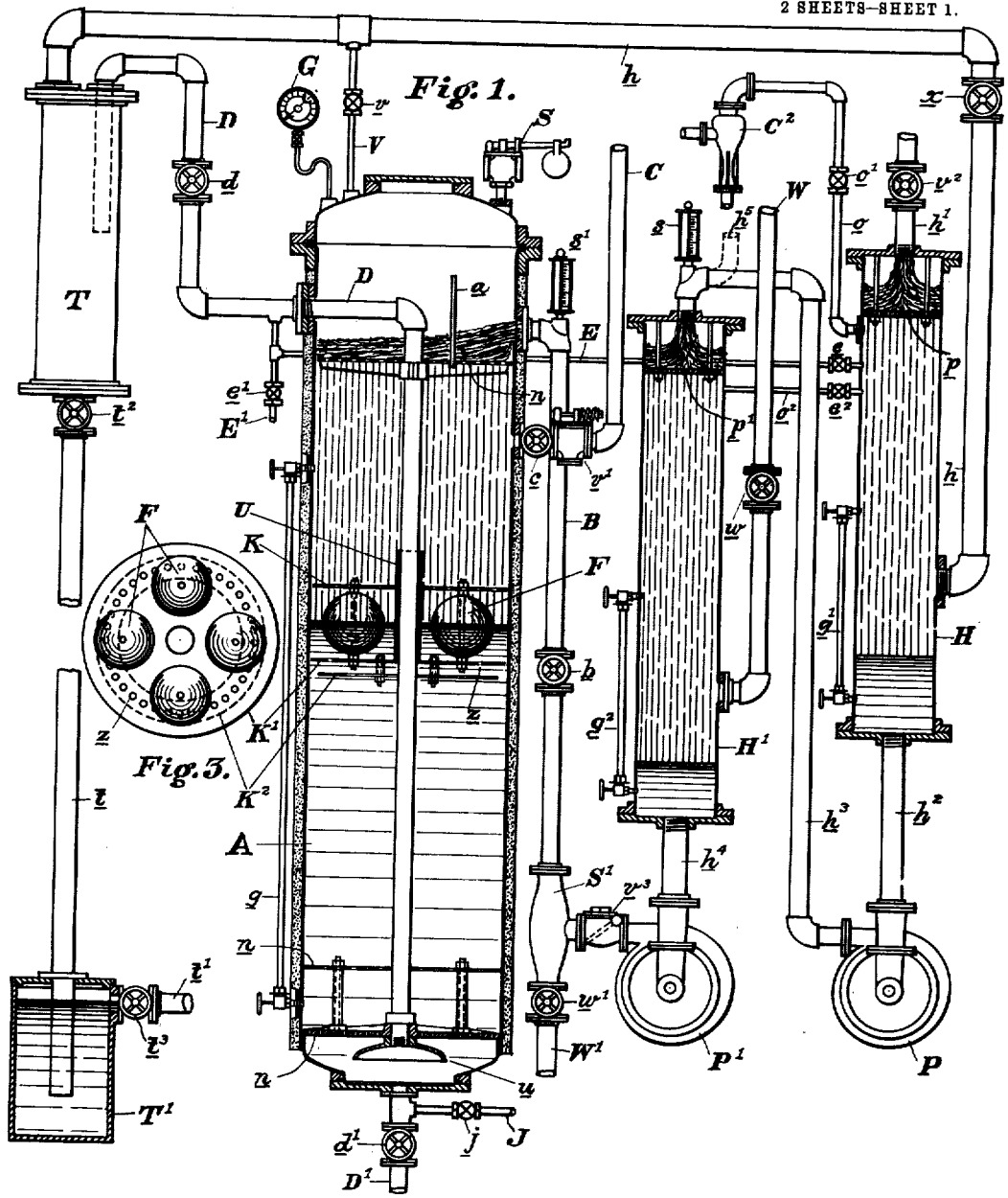

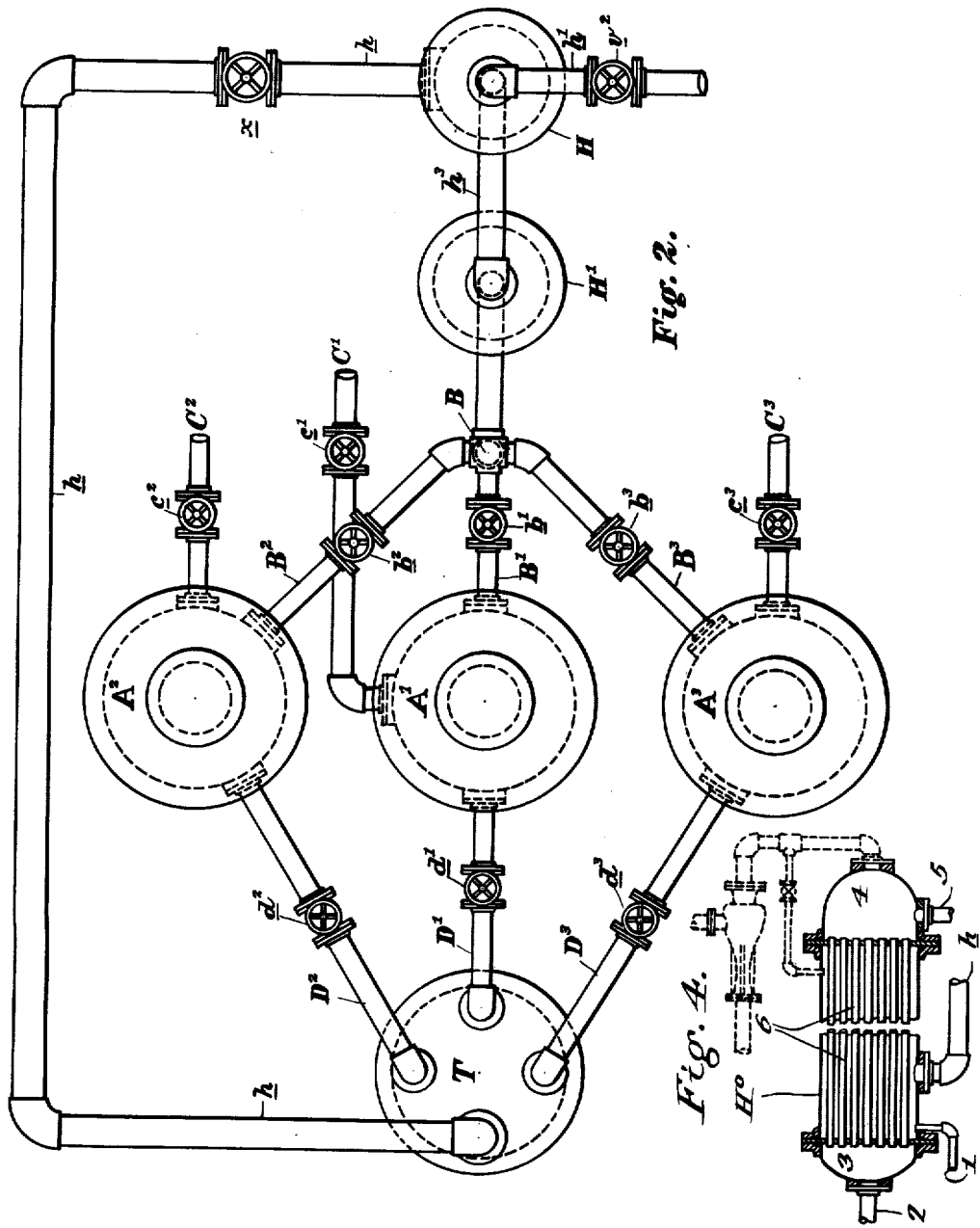

SAMUEL MORRIS LILLIE, OF PHILADELPHIA, PENNSYLVANIA.

STARCH-CONVERSION PROCESS.

1,023,257.   Specification of Letters Patent.   Patented Apr. 16, 1912.

Application filed January 8, 1912. Serial No. 670,040.

*To all whom it may concern:*

Be it known that I, SAMUEL MORRIS LILLIE, of Philadelphia, Pennsylvania, have invented a new and useful Starch-Conversion Process, of which the following is a specification.

The object of my invention is to obtain a conversion product from starch, in which all its constituent parts have been given approximately the same degree of conversion, *i. e.* all have been approximately equally subjected to the action of water, heat and of a converting agent, say hydrochloric acid. In my United States Patent #959,237, dated May 24, 1910, I have disclosed and claimed a method of obtaining such conversion products by a continuous process, in this application I disclose and claim a method of obtaining such conversion products by intermittent working, that is by converting the starch in batches.

A second object of my invention is to recover heat used in converting the several batches and employing it for heating purposes, such as in heating starch liquors preparatory to their conversion, and a third object is to employ exhaust steam for heating the starch liquor prior to the conversion.

Generally speaking my process consists in heating the starch liquor for a conversion, *i. e.* a mixture of starch, water, and converting agent, hereinafter referred to as " starch liquor " quickly, *i. e.* with little or but partial conversion to the desired converting temperature, in delivering this heated starch liquor continuously into a converting vessel, with as little admixture as possible of its parts as they follow each other into the same, in continuing this flow of liquor into the vessel until the first portions which entered show the degree of conversion desired for the starch liquor of the batch, in then stopping the inflow of the starch liquor and in withdrawing the parts of the liquors from the vessel in the same order and rate of flow with which they entered it. The heating of the " starch liquor " is done in succession to progressively higher degrees, by exhaust steam, and by high pressure steam, with a preliminary heating by heat obtained from the converted liquor. In this case the heat obtained from the converted liquor of one batch conversion is employed for heating the starch liquor for a subsequent batch conversion. This heat from the converted product may be used for other heating purposes than that just described.

Apparatus adapted for practicing my process is shown in the accompanying drawings of which—

Figure 1— is a single converting vessel combined with means for transferring heat from the converted product to the starch liquor, and means for further heating the starch liquor by exhaust and high pressure steam. Fig. 2— shows a combination of three converting vessels which may be used in succession for converting batches of starch liquor, combined with means whereby heat from one batch of converted liquor may be transferred to the starch liquor of another batch conversion. Fig. 3— shows a detail of the construction of the converting vessel shown in Fig. 1, and Fig. 4— shows a surface heater H° which may be employed for utilizing heat from the converted liquor for heating purposes. This heater, Fig. 4—, may also represent an evaporating apparatus in which the heat from the converted liquor may be used for the special heating purpose of evaporating the converted glucose liquors, which is a step in the general process of producing the commercial article.

Referring to Fig. 1, the vertical cylinder A is the converting vessel or converter. In it are contained a number of fixed horizontal perforated diaphragms $n$ of approximately the same diameter as the interior of the cylinder. Two of these diaphragms are located near the bottom of the cylinder and another toward the top of the cylinder at a point somewhat distant above the highest elevation the surface of the converting column will reach under normal working. A discharge pipe D, shown axial in the figure, extends from below the lowest diaphragm where it is fitted with the inverted cup $u$ up through all the diaphragms and through the side of the cylinder above the upper diaphragm and leads into a closed tank T, hereinafter referred to as " pressure reducing tank," which has an outlet above through the pipe $h$ fitted with valve $x$ which pipe leads into a spray condenser or heater H, hereinafter more fully described. Below, the tank T has a drain pipe $t$ fitted with valve $t^2$ which pipe leads down into and nearly to the bottom of the sealing tank T'—which tank has an overflow pipe $t'$.

This tank T' is sufficiently below the tank T to seal the pipe $t$ should there be a considerable vacuum in the tank T. The discharge pipe D is fitted with a hand valve $d$. Pipe D' fitted with a valve $d'$ leads from the bottom of the cylinder A and serves for draining the same, if desired. In addition to the fixed perforated diaphragms $n$ there are two movable or floating perforated diaphragms K and K'. These diaphragms are built on a sleeve U which surrounds the discharge pipe D loosely and is free to move up and down the same. Between the two diaphragms are floats F, shown in the drawings as four in number, which are placed between the diaphragms and to which the two diaphragms are attached respectively above and below the floats. The construction of this floating pair of diaphragms is shown in plan in Fig. 3. The upper diaphragm is perforated approximately throughout its entire surface, the lower diaphragm has perforations $z$ arranged in a circle concentric with the cylinder and fastened to the lower diaphragm, and supported below it is a metal ring $K^2$ directly underneath the circle of perforations so that any liquor passing downward through the perforations impinges upon the metal ring below and is deflected horizontally on each side.

C is a steam pipe which opens into the vessel A below the upper diaphragm, but above the level to which the converting column of liquor will in practice ever rise as hereinafter described. The pipe C is fitted with a hand-valve $c$ and also with a pressure reducing valve $v'$. The cylinder A is provided with safety valve S, pressure gage G, air vent pipe V, with valve $v$, leading into the pipe $h$ and also with provisions for indicating the height of liquor in the vessel, such as the gage glass $g$ on the side of the same. A small test pipe E with valve $e$ leads from the discharge pipe D at a point below its valve $d$ into the heater H. Between its valve $e$ and the pipe D is a small branch pipe E' fitted with a valve $e'$ and opening into the atmosphere. A small pipe J, fitted with valve $j$, leads into the cylinder A below the lower diaphragm in the same, and immediately under the inverted cup $u$ of the discharge pipe D.

The spray condenser, or heater H consists of a vertical cylinder, closed top and bottom, shown in vertical axial section in the drawing. It contains a horizontal perforated plate $p$ near the top upon which delivers through the top of the heater the liquor conducting pipe $h'$ which is fitted with a hand valve $v^2$ and leads from a source of supply of the mixture of starch, water and acid which is to be treated in the apparatus being described. From the bottom of the heater H a pipe $h^2$ leads to the suction of centrifugal pump P. Into the side of the heater a short distance above the bottom leads the pipe $h$, from the pressure reducing tank T. From the heater just below the perforated plate $p$ leads a vent pipe $o$ having a valve $o'$, which leads to a vacuum producer, such as the ejector condenser $C^2$, by means of which a partial vacuum may be maintained in the heater H, and in the connected pressure reducing tank T. By means of the ejector condenser $C^2$ and the regulating valve $o'$ in the vent pipe $o$ any vacuum may be maintained in the heater H up to the limits of the ejector condenser $C^2$, which may be up to say 28" of mercury. I have repeatedly noticed vacuums of 28" and over maintained by these condensers in apparatus. The heater is provided with a gage glass $g'$ to indicate the depth of liquor in the former.

The intermediate heater or condenser H' is similar in construction to the heater H. The pipe $h^3$ leads from the pump P of the heater H into the heater H' above the perforated plate $p'$ in the same. It may be fitted with a thermometer, S, to indicate the temperature of the liquor as it enters the heater H'. The pipe W, fitted with hand valve $w$, is a low pressure steam pipe (such as exhaust steam) which opens into the heater H' as shown. This heater is provided with a vent pipe $O^2$ and valve $e^2$ which leads from the heater just below the perforated plate $p'$ into the heater H. It may have a valved branch which opens into the atmosphere or elsewhere than into the heater H. From the bottom of the heater H' a pipe $h^4$ leads to the pump P' which delivers through the steam injector S' and the conduit B above the same into the vessel A above the uppermost diaphragm in the same. The conduit B is fitted with valve $b$. A high pressure steam pipe W' with valve $w'$ supplies the injector with steam as desired. A check valve $v^2$ is located between pump P' and injector S'.

The method of using the apparatus described above is as follows: Air is first driven from the various parts of the empty apparatus, as for example, by introducing steam continuously through the pipe W into the heater H' having previously opened the valves in the connecting pipes between the several parts of the apparatus excepting the valve $d$ in the pipe D between A and T. The steam entering the heater H' displaces the air in it—some of the air passing through the pipe B into the vessel A, some of it through the pipes $h^3$ and $h^2$ into the bottom of the heater H. The steam follows the air and forces most of the air in the heater H out of it through the vent pipe $o$, whose valve O' has also been opened. Through the pipe B the steam passes into the upper part of the vessel A and displaces the air in it, through the pipe D', whose valve $d'$ is open during the process of driving out the air: when steam shows at the outlet of pipe $D'$, or the pipe feels hot, the valve $d'$ may be closed. The air in the upper part of vessel A escapes by the vent pipe V into the tank T. The air in T is displaced by steam entering it through vent pipe V and from the heater H by the pipe $h$, the air escaping from it through the pipe $t$. When the pipe $t$ is made hot, by the escaping steam, it may be concluded that the air has been pretty well displaced from the entire apparatus. The valve $t^2$ in drain pipe of tank T, valve $o'$ in vent pipe of heater H, and valve $v'$ in vent pipe V of vessel A may now all be closed. The floating diaphragms K, K' are resting at the bottom of the empty vessel A. The valve $v^2$, in the starch pipe $h'$ is now opened, and the mixture of acid starch and water hereinafter termed "starch liquor" is delivered through the same into the heater H at the approximately constant rate necessary to handle the material in the quantities desired. The starch liquor passing through the perforated plate $p$ in the upper part of the heater falls through the heater H in a shower, passes to and is delivered continuously by the pump P onto the perforated plate $p'$ of the heater H', falls through the latter in a shower, and passes to and is delivered by the pump P' through the steam injector S' and conduit B into the vessel A upon the uppermost of the perforated diaphragms, through which it is showered into the space below. In Fig. 1 the steam injector S' and passage above are shown relatively small in diameter but may be made larger in proportion, as indicated at H' in the drawings of my U. S. Patent #959,237. When the starch liquor is started into the heater H, as described, the valve $w$ is opened to let the low pressure steam (say exhaust steam from engines and pumps) into the heater H', the valve $w'$ is opened to allow high pressure steam to enter the steam injector S', the valve $c$ in the high pressure steam pipe to vessel A is opened, the pressure reducing valve $v'$ set to maintain the converting pressure, or a little above in the vessel A, the relief valve S set to relieve the pressure in A, should it rise above normal, i. e., above a pressure corresponding to a temperature a little above the converting temperature, and the valve $e$ in the test pipe E is opened so that there is a constant flow into the heater H, from the section of the discharge pipe D, below the valve $d$. The stream of starch liquor entering the heater H when it reaches the heater H' is heated by the low pressure steam to the temperature the latter is capable of imparting—and on reaching the steam injector S' it is heated by high pressure steam on its way to the vessel A. The steam passing through the injector S', is preferably regulated so that the stream of starch liquor shall be at about the desired converting temperature when entering the vessel A. Entering the vessel A, it showers through the atmosphere of steam therein, and if it has entered below the desired temperature it is brought to it by contact with this steam. If materially above the converting temperature and pressure it is lowered by the escape of steam through the safety valve S. Such escape of steam indicates that too much steam is entering through the injector S'. When starting operations the heated starch liquor entering the vessel A gradually fills the vessel, the floating diaphragms K, K' rising with the surface of the liquor. The showering liquor impinges upon the upper diaphragm K—which breaks the force of its fall—falls through it gently upon the surface of the liquor between the two plates, flows through the circle of holes, $z$, in the lower plate K', and by the ring K below the holes is delivered horizontally and smoothly into the body of the liquor with very little agitation of the latter vertically, a condition favorable to a uniform conversion. Owing to the valve $e$ in the pipe E being open there is a constant flow of the hot starch liquor from the pipe D through the pipe E, and samples taken by opening the valve $e'$, in branch E' indicate very closely the condition of the liquor which would discharge into the closed tank T were the valve R opened. Samples taken show increasing degrees of conversion as the level of the liquor rises in the cylinder, until at last the sample indicates the degree of conversion desired. The inflow of starch liquor is now stopped, and the valve $d$, in the discharge pipe D is opened to a degree which will allow the liquor to escape from the converter A, at the same rate at which the starch liquor had entered the converter while charging the same. The first of the liquor to leave the converter is the liquor which first entered it, and similarly with every other portion, or say horizontal layer, each leaves the converter in the order in which it entered the converter, and if the liquor is drawn away at the same rate at which it entered the converter it necessarily follows that each portion of the liquor is in the converter and is subjected to the converting effects of the acid and the temperature in the converter the same length of time, viz. the time occupied in charging it (or emptying it) plus any time that intervened between stopping the flow of starch liquor into the converter, and the commencing to discharge it from the converter, and in consequence all portions of the product have approximately the same degree of conversion. The liquor passes discharge pipe D into the closed pressure reducing tank T, in which a lower pressure is maintained than in the converter A through the connection of the former with the low pressure condenser (heater) H through the pipe $h$. Due to this lower pressure vapor is generated in the tank T from the liquor, and this vapor passing into the heater H heats starch liquor showering through the same which is treated in a subsequent conversion as hereinafter described in connection with Fig. 2. The converted starch liquor flows from the tank T down through the pipe $t$, the valve $t^2$ being open, into the closed sealing tank T', and passes away through its overflow $t'$: the valve $t^3$ in the latter permits of throttling this overflow if it is desired to carry a pressure above atmospheric in the tank T. Again the liquor in the sealing tank T' prevents air passing up into the tank T should a partial vacuum be maintained therein by the action of the condenser or heater H and exhaust through the vent pipe $o$, to the vacuum producer $C^2$. If a partial vacuum be carried in the heater H, and in pressure reducing tank T, a greater fall in temperature will occur in the liquor in the tank T, a greater amount of vapor will be disengaged from it and more vapor and heat will pass into the heater H to be recovered in the cold starch liquor than is the case when atmospheric pressure or above is maintained in the heater H and pressure reducing tank T. A further advantage is that the converted liquors which are sensitive to injury by heat, will pass at lower temperatures through the immediately following steps of the process of manufacture. As hereinbefore stated, the vacuum maintained in the heater H and consequently in the connected pressure reducing tank T may be anything up to the power of the ejector condenser $C^2$ by proper regulation of the valve $o'$ in the vent pipe $o$ and assuming this limit to be say 28″ of mercury vacuum, the temperature of the converted liquors leaving the pressure reducing tank, passing through the immediately following steps of the process, may be as low as say 105°, and by regulation of the vacuum by valve $o'$ the temperature may be anything from the lower limit, whatever it may be, up to atmospheric pressure, or higher for that matter, since the system is a closed system. It is to be noted that the converted liquor on entering the pressure reducing tank is instantly lowered in temperature to that corresponding with the vacuum carried in the latter. It is apparent that for different products which may work in the following steps of the process to greater advantage at different temperatures respectively, the best temperature may always be given to it by the regulation of the pressure or vacuum in the pressure reducing tank T.

Neutralization of the acid in the converted liquor is necessary to the subsequent steps of the manufacturing process and may be done in any one of a variety of ways. One way is to do this before the liquor enters the pressure reducing tank T, e. g., by introducing continuously in regulated quantities a solution of the neutralizing agent into the lower end of the discharge pipe D to mix with the liquor leaving the converting vessel A, by means of the pipe D', as shown and claimed in my Patent #959,237, May 24, 1910, or the neutralizing solution may be introduced into the discharge pipe D at a point beyond the regulating valves $d$. An arrangement for thus introducing the neutralizing re-agent is shown and described in detail in one of my pending applications for U. S. patents. By neutralizing the acid before the liquor leaves the vessel A the vapors passing from the tank T are less acid, and less destructive to the connections through which it passes, than if the neutralizing is done after the liquor leaves the tank T, and the liquor leaving the vessel A is also less corrosive and may be passed through heat transformers of metal with little corrosion of the metal surfaces.

In Fig. 2 are shown three converting vessels, or converters, A', $A^2$, $A^3$, which are served by a single pressure reducing tank T. The discharge pipe D of each converter leads into the tank and is fitted with a valve $d$. The pipes are respectively lettered D', $D^2$, $D^3$ and the valves $d'$, $d^2$, $d^3$. The three converters are served also by a single pre-heating system which is represented by the two heaters H and H'; H being a low pressure heater in which the vapors released in the common pressure reducing tank T are employed in heating the cold starch liquor as hereinbefore described, and H' being a heater in which high pressure steam is employed for a further heating of the starch liquor preparatory to passing into one or more of the converters. A starch liquor feed pipe to the heater H is represented by $h'$. A liquor conducting pipe $h^2$ leads from heater H to heater H', and a discharge pipe $h^3$ leads from heater H to heater H', and a discharge pipe B for the heated starch liquor leads from heater H', which pipe has three branches—$B^1$, $B^2$, $B^3$,—leading into the upper parts of the several converters $A^1$, $A^2$ $A^3$, in the manner and at the point indicated in Fig. 1. The branches are provided with suitable valves—$b^1$, $b^2$, $b^3$, respectively. For simplicity's sake the third heater or steam injector S' of Fig. 1 is omitted in Fig. 2, the heater H' in the latter serving to give the higher temperature to the starch liquor before it enters a converter, as is done by the heater H' of my Patent #959,237. Assuming the air to have been driven from the system as before, the converters are used in succession. Assuming them all empty but heated to the converting temperature, the hot acidulated starch liquor is delivered into converter A' (say) at the "uniform rate" necessary to handle the desired quantity of material in a given period, and this is continued until the sample of liquor running from or taken from the test pipe E' (Fig. 1) shows the degree of conversion wanted. Then the "uniform flow" of heated starch liquor is changed at once to another converter, say A², and the discharge valve d' of converter A' is opened so that the discharge from the same is at practically the same rate at which the starch liquor had been delivered into it when charging it. Following this scheme it necessarily follows that every part of the liquor discharged from the converter is subjected to the conditions therein practically the same length of time, and issues from the converter with practically the same degree of conversion. When the last of the liquor leaves the converter the discharge valve is closed and the converter is ready for another charging. The charging of the converter A² at the "uniform rate" with the hot acidulated starch liquor is continued until the samples from its discharge pipe show the degree of conversion desired, when the "uniform flow" is at once changed from it into converter A³, and converter A² is emptied at the uniform rate at which it was filled in the manner and with the results just described for converter A'. When converter A³ is charged to the point that the samples from its discharge pipe show the conversion wanted for its product, the "uniform flow" of the hot starch liquor is changed into converter A', and converter A³ is emptied at the uniform rate of outflow at which it was filled. If the temperature conditions in all the converters are the same and the same degree of conversion is had from each converter, then there will be a nearly constant and uniform flow of converted liquor into the common reducing pressure tank T, and disengagement of vapor for use in the heater H. A variation of this procedure consists in stopping the flow of liquor into the converting vessel before the first entering portions have reached the desired degree of conversion, in allowing the liquor in the converting vessel to stand until the said first entering portions have reached the desired degree of conversion, and then emptying the converting vessel at the same uniform rate at which it entered the converting vessel and in the same order or sequence as hereinbefore described.

With respect to the vessel A, Fig. 1, it is apparent that the lower portion of the vessel,—i. e. the portion which is filled with and emptied of the starch liquor,—may be considered as the converting vessel proper, while the upper portion, in which the starch liquor is showered through an atmosphere of steam, may be considered as part of the heating system by which the starch liquor is brought to the converting temperature prior to being delivered into the converting vessel proper, viz. the lower part of the vessel A.

Large quantities of hot water are used in a glucose factory for washing bone black and for other purposes and it is evident that instead of the "starch liquor" water may be passed through the heater H, and be heated by the vapors separated in the pressure reducing tank from the converted liquors, and the resulting heated water be used for the various procedures in the glucose factory which require hot water, or it may be used for mixing with the starch and acid to form the "starch liquors." When the vapors from the converted product are thus used for heating water, the starch liquor is delivered into the heater H', as by the pipe indicated in dotted lines at $h^5$, and the liquor is heated in succession by the exhaust steam and high pressure steam without the preliminary heating by the vapors from the converted liquors. As the acid in the converted liquors is neutralized before the disengagement of the vapors, the latter are approximately neutral and a surface heater may, without serious deterioration by corrosion, be used instead of the spray heater H for recovering the heat from the conversion vapors. Such a surface heater is shown in section in Fig. 4. The conversion vapors would enter it at $h$, the condensation of the vapors flow away at $k$ and the water or other liquid for that matter would enter the heater at 2 and passing up through the tubes, pass away heated at 5. This heater H° may be also considered as an evaporator in which the glucose liquors are evaporated by the conversion vapors. Evaporating is a particular form of heating, as the latter term is used in this specification. In the heater H° the tubes 6, extend below through a tube plate into the chamber 3, above through a tube plate into the chamber 4. This construction H° may be considered as a vertical tube evaporator which may be connected from above by vapor main to a condenser as indicated in dotted lines in the figure.

It is apparent, that when converting the starch liquor in batches by using the converters in succession, the vapors obtained from one batch or converter charge of liquor are employed for the preliminary heating of the starch liquor for a subsequent batch or converter charge. Of course, each converter may have its own pressure reducing tank, and then their respective liquor products may be kept entirely separate from each other, but the vapors from all go to a common preliminary heater H, or again each converter may have its own pressure reducing tank and also its own preliminary heaters H, H', &c. In this last case, the vapor pipe from each pressure reducing tank has branches, fitted with valves, leading to each of the heaters H, so that its vapors may be employed for heating purposes in the heater of any one of the converters.

I do not limit myself to the exact procedures and apparatus described herein, for departures may be made from each without passing beyond the scope of my invention.

I purpose claiming in another application the combination of apparatus illustrated and described, but not claimed in this application.

I claim as of my invention:—

1. The intermittent or batch process of converting starch to produce a product the constituent parts of which have all approximately the same degree of conversion consisting in heating a starch liquor comprising a suitable mixture of starch, water, and acid to the converting temperature under heating conditions to produce a heated starch liquor of only partial but practically uniform conversion; in delivering this heated liquor into a vessel, with as little admixture as may be in the vessel of the consecutive portions of the liquor as they pass into the vessel, until the liquor which first entered the vessel shows the degree of conversion desired for the product; in then stopping the inflow of heated liquor to the vessel and in withdrawing from the vessel the portions of the liquor in the same order in which they entered the vessel and at approximately the same rate of flow.

2. The intermittent or batch process of converting starch to produce a product the constituent parts of which have all approximately the same degree of conversion consisting in heating a starch liquor comprising a suitable mixture of starch, water, and acid to the converting temperature under heating conditions to produce a heated starch liquor of only partial but practically uniform conversion; in delivering this heated liquor into a vessel, with as little admixture as may be in the vessel of the consecutive portions of the liquor as they pass into the vessel; in stopping the flow into the vessel before the liquor which first entered the vessel shows the degree of conversion desired for the product; in allowing the charge to remain in the vessel until the liquor which first entered the same shows the degree of conversion desired for the product; in then withdrawing from the vessel the portions of liquor in the same order in which they entered the vessel and at approximately the same rate of flow.

3. The process of utilizing vapors released from the products of the conversions of starch liquors in which the respective conversions are consecutive consisting in heating the starch liquor to be used in one conversion by the vapors released from the products of a preceding conversion.

4. The process of heating starch liquor preparatory to converting the same at a high pressure consisting in heating the starch liquor in succession by vapors of progressively increasing temperatures.

5. The process of quickly reducing to comparatively low temperatures, with a corresponding disengagement of vapors, converted starch liquors produced at high temperatures, consisting in delivering the hot converted liquors into a chamber in which a vacuum i. e. pressure below atmospheric is maintained, and in adjusting the degree of vacuum in said chamber to produce the temperature desired in the converted liquor.

6. The process of converting starch liquors under heat and pressure and of recovering heat from the converted liquor and utilizing the same, consisting in converting the starch liquors in succeeding batches in a series of closed vessels in rotation, in lowering the pressure on the converted batches of liquor in the same order of succession and in employing the respective resulting vapors in succession for a common heating purpose.

7. The process of treating starch liquors in the manufacture of glucose and other derivatives consisting in converting the starch liquors under temperatures at or above the boiling temperature of the liquor at atmospheric pressure, in artificially cooling the converted liquors quickly to temperatures below the boiling point at atmospheric pressure preparatory to subjecting the liquors to subsequent steps in the manufacture of the commercial products.

S. MORRIS LILLIE.

Witnesses:
 COLIN D. SMITH,
 JOHN W. SETTLE.